United States Patent [19]

Eads

[11] 3,724,188

[45] Apr. 3, 1973

[54] LEAF RAKE WITH IMPROVED MOLDED HEAD

[75] Inventor: Harold O. Eads, Parkersburg, W. Va.

[73] Assignee: McDonough Co., Parkersburg, W. Va.

[22] Filed: May 23, 1972

[21] Appl. No.: 256,166

[52] U.S. Cl. .............................................56/400.17
[51] Int. Cl. .................................................A01d 7/00
[58] Field of Search.........56/400.17, 400.01, 400.11, 56/400.12, 400.16

[56] References Cited

UNITED STATES PATENTS

| | | | |
|---|---|---|---|
| 1,780,180 | 11/1930 | Falstrom | 56/400.17 |
| 1,870,739 | 8/1932 | Lambert | 56/400.17 |
| 3,654,754 | 4/1972 | Scoggin et al. | 56/400.17 |

FOREIGN PATENTS OR APPLICATIONS

| | | | |
|---|---|---|---|
| 796,116 | 6/1958 | Great Britain | 56/400.17 |

*Primary Examiner*—Russell R. Kinsey
*Attorney*—John W. Malley et al.

[57] ABSTRACT

A leaf rake of the tine type comprising a rake head molded of polypropylene or the like as an integral unitary structure including a handle part of rigid ribbed panel construction providing a centrally located socket for receiving the end of the rake handle and a tine part having an intermediate portion provided with openings and tapered ribs to insure outwardly increasing flexibility, the intermediate portion terminating in a band section disposed within the outer half of the tine part which also includes a series of flexible L-shaped tines extending from the band section.

14 Claims, 7 Drawing Figures

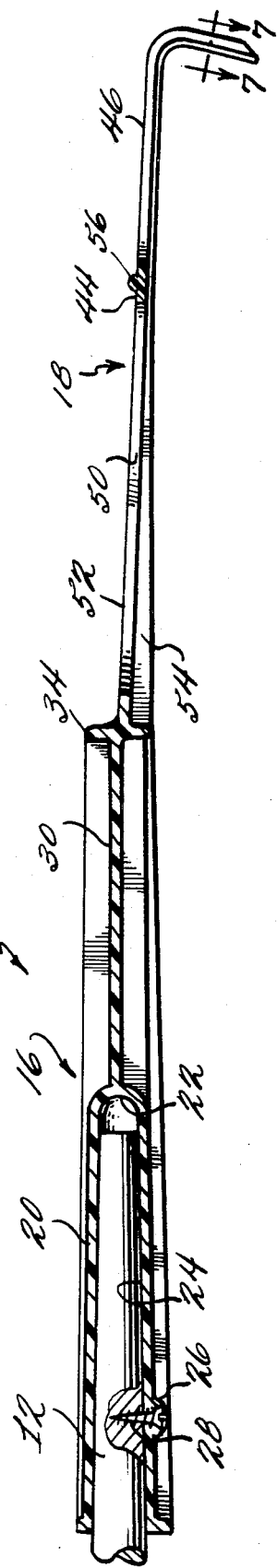

LEAF RAKE WITH IMPROVED MOLDED HEAD

This invention relates to rakes and more particularly to improvements in leaf rakes of the tine type.

The rakes in widespread use used to clean yards of leaves, grass clippings etc., are usually constructed of steel because of the strength, temper and availability of the material. The long, springy tines provided by such rakes and their larger size make them a more efficient tool for this use than conventional bow or level head rakes. These steel leaf rakes are also used to some degree for thatching (digging out dead grass) as their thin tines and sharp corners are suitable for this function. In addition to steel tine rakes, bamboo leaf rakes have also received considerable acceptance. The appeal of the bamboo rakes is that the heads can be larger than steel rakes and still have a comfortable light weight. The larger size prevents leaves from passing over the top of the head when raking large amounts of leaves. A steel tine rake of this acceptable size would simply be too heavy.

Bamboo rakes are constructed of long thin strips of bamboo that are assembled with wires, screws and metal brackets. While the appeal and acceptability of bamboo rakes has been proven, they do have certain deficiencies in function and other problems. First, because there are so many parts interconnected by wires, screws and metal brackets, bamboo rakes are subject to damage in use and in shipment or in warehousing. Moreover, bamboo is subject to attack by small bugs. Furthermore, the quality of the bamboo used in making rakes can vary from year to year depending to some degree on the success of a bamboo crop in a given year.

An object of the present invention is to provide a rake which has all of the advantages of both steel tine rakes and bamboo rakes, without the disadvantages thereof. In accordance with the principles of the present invention, this objective is obtained by molding a rake head of a plastic material such as polypropylene or the like. By utilizing a material such as polypropylene, the deficiencies relating to the quality and availability of bamboo are eliminated. By molding the rake head into a one piece construction, the damage to which bamboo rakes are susceptible is substantially alleviated. Moreover, a relatively large rake can be formed which still has the same comfortable light weight as bamboo in comparison with steel construction.

It is recognized, that children's toy leaf rakes of a relatively small size, molded of flexible polyethylene have been commercially available for some years. These rakes, while suitable for their intended purpose as a toy, are so flimsy and flexible that they do not provide the capability of functioning as an equivalent to the known bamboo and steel tine leaf rakes presently in use. This is particularly true with respect to the capability of using such rakes for thatching.

Accordingly, it is a further object of the present invention to provide a leaf rake having a molded plastic head which is constructed so as to function for an extended period of time without failure as a conventional leaf rake and thatcher. In accordance with the principles of the present invention, this object is obtained by molding the rake head as a unitary structure including a handle engaging part and a tine part, the handle engaging part being sufficiently rigid to withstand forces that would normally be manually applied thereto without breaking, and the tine part being sufficiently flexible so that it will flex during operation and not break.

Still another object of the present invention is the provision of a rake head of the type described which is simple in construction, effective in operation and economical to manufacture.

These and other objects of the present invention will become more apparent during the course of the following detailed description and appended claims.

The invention may best be understood with reference to the accompanying drawings, wherein an illustrative embodiment is shown.

In the drawings:

FIG. 5 is an enlarged sectional view taken along the line 5—5 of FIG. 1 showing the connecting portion of the rake handle;

FIG. 6 is an enlarged fragmentary sectional view taken along the line 6—6 of FIG. 1; and FIG. 7 is an enlarged fragmentary sectional view taken along the line 7—7 of FIG. 5.

Figure 1:
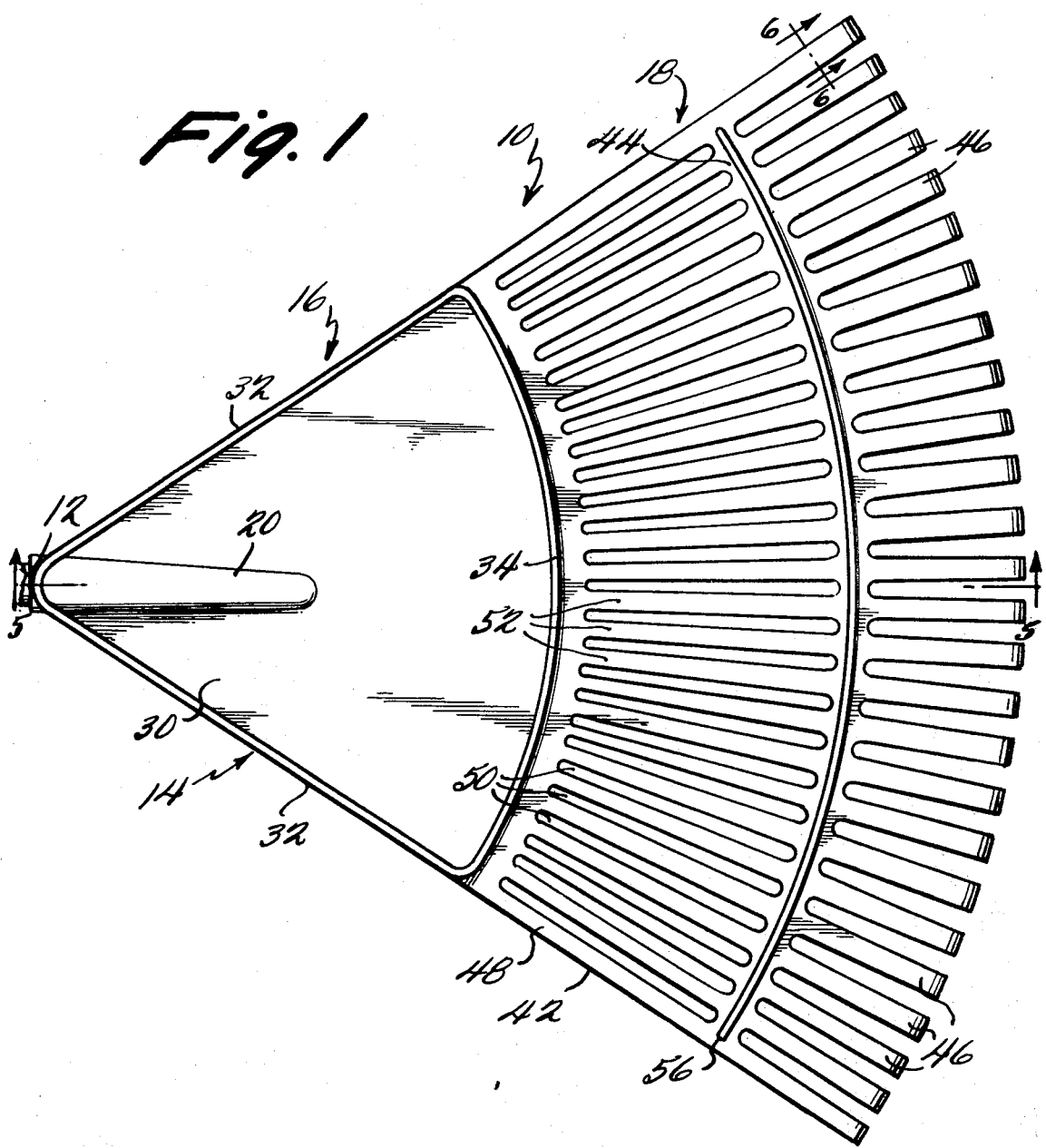
FIG. 1 is a top plan view of a rake head embodying the principles of the present invention.
Figure 3:
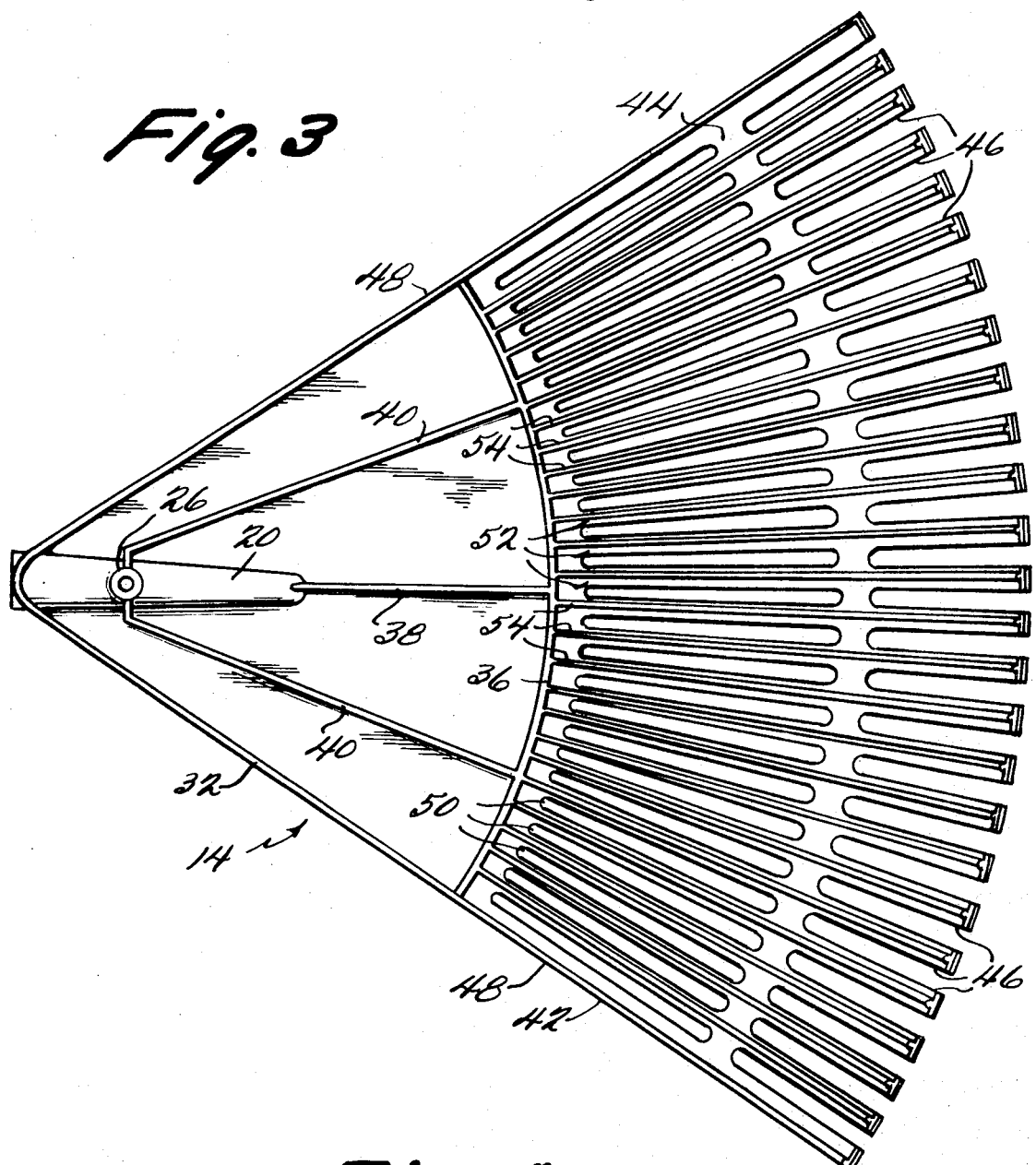
FIG. 3 is a bottom plan view of the rake head.
Figure 4:
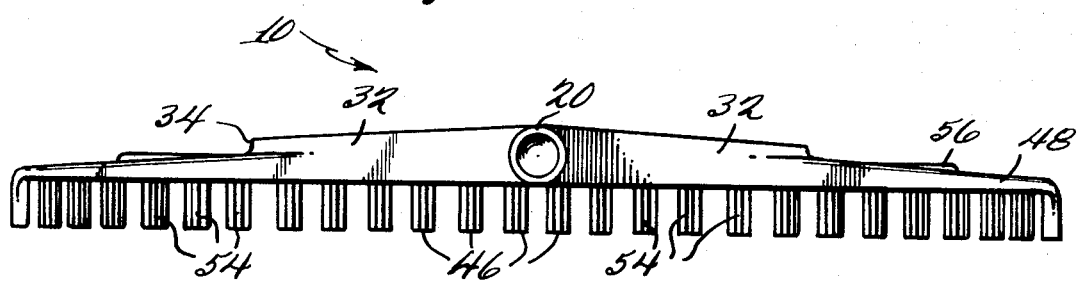
FIG. 4 is a rear elevational view of the rake head.

Referring now more particularly to the drawings, there is shown therein, a leaf rake, generally indicated at 10, embodying the principles of the present invention. The rake 10 includes the usual handle 12 and a rake head, generally indicated at 14, constructed in accordance with the principles of the present invention. As best shown in FIGS. 1 and 3, the rake head 14 is molded as a single unitary structure of a suitable plastic material, as, for example, polypropylene or the like. In the preferred embodiment shown, the rake head is of conventional fan shaped configuration, although it will be understood that the rake head may assume other conventional shapes, as, for example, a segmental shape in which the outer periphery is straight rather than arcuately curved. Likewise, the rake head may assume the shape of a conventional steel tine leaf rake if desired.

In accordance with the principles of the present invention, the unitary rake head structure 14 includes two basic parts, the first being a handle engaging part, generally indicated at 16, and the second being a tine part, generally indicated at 18. The handle engaging part 16 is of rigid construction suitable to withstand forces that could be manually applied thereto, without breaking. The tine part 18 is flexible so as to provide the necessary flexing action without breaking. To this end, the handle engaging part 16 includes a centrally located, elongated, longitudinally extending socket portion 20 which is of generally tapered configuration including an interior configuration conforming to the end of the handle 12 of the conventional construction. As best shown in FIG. 5, the internal configuration of the socket portion 20 includes a generally dome-shaped closed inner end surface 22 and a slightly tapering frusto-conical surface 24 extending therefrom to the open end of the socket portion. One wall of the socket portion 20 is formed with an exterior boss 26 apertured to receive a suitable fastening element, such as a screw 28 or the like, which serves to fixedly secure the end of the handle 12 within the socket portion 20.

The handle engaging part 16 also includes a panel portion 30 extending transversely from opposite sides of the socket portion 20, the panel portion being of generally fan shaped configuration in plan, as shown in FIG. 1. Formed integrally along the outwardly diverging edges of the panel portion 30 and extending from the open end of the socket portion 20 to the outer end of the handle engaging part 16 is a pair of exterior ribs 32 integrally joined with the panel portion edges intermediate the width thereof. An interior arcuate rib 34 is formed on the top side of the panel portion 30 between the outer ends of the ribs 32 in a position adjacent the juncture of the rigid handle engaging part 16 and the flexible tine part 18. As best shown in FIG. 3, a similar interior rib 36 is formed on the underside of the panel portion 30 adjacent the juncture between the parts 16 and 18. In addition, the underside of the panel portion 30 is further strengthened by a longitudinal rib 38 extending from the closed end of the socket portion 30 to the mid point of the interior rib 36 and a pair of outwardly diverging intermediate ribs 40 extending from the boss 26 outwardly to the interior rib 36.

The tine part 18 includes an intermediate portion 42 extending longitudinally outwardly from the handle engaging part with a transverse extent generally in the direction of the panel portion. The intermediate portion 42 has a continuous transversely extending band section 44 at the outer extremity thereof spaced longitudinally from the handle engaging part 16 within the outer half of the tine part 18 and preferably within the outer third thereof. The tine part 18 also includes a plurality of individual tines 46 of generally L-shaped configuration spaced transversely along the band section 44 and extending outwardly thereof with their free ends extending in a direction generally transverse to the transverse extent of the band section 44.

Figure 2:
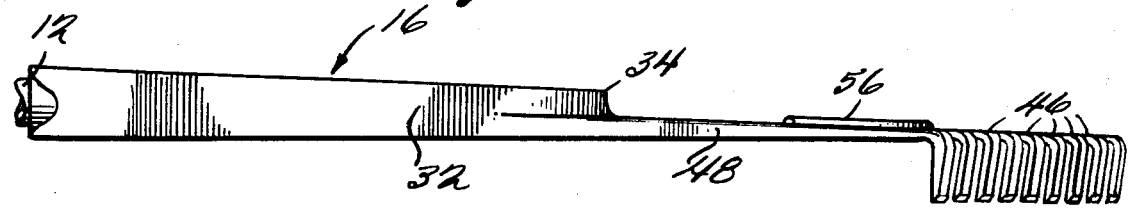
FIG. 2 is a side elevational view of the rake head shown in FIG. 1.

The intermediate portion 42 includes opposed edge sections 48 which are of generally L-shaped cross-sectional configuration, one flange of which forms an outwardly converging continuation of the exterior ribs 32 extending from the underside of the panel portion 30. As best shown in FIG. 2, the tapering end flanges of the insections 48 extend continuously to the outer tines 46 and merge smoothly therein at a position adjacent the free end portions of these end tines. The intermediate section 42 also includes a multiplicity of openings 50 formed therein in a position between the band section 44, the handle engaging part 16 and the end section edge sections 48. As best shown in FIGS. 1 and 3, the openings are of elongated outwardly converging tapered configuration defining a multiplicity of tine shaped sections 52 extending from the band section 44 to the handle engaging part in generally aligned relation with the tines 46. As best shown in FIGS. 3 and 5, the openings of 50 cooperate with the thickness of the material forming the tine shaped sections 52 to provide the intermediate portion with a flexibility which increases in a direction from the handle engaging part 16 toward the band section 44. To this end, each of the tine shaped sections 52 is formed with a central longitudinally extending rib 54 which gradually diminishes from the height of the arcuate interior rib 36 to a height of generally semi-cylindrical bead-like configuration at a position adjacent the band section 44.

Each of the ribs 54 continues outwardly through the band section 44 and an associated tine 46 and terminates at the outer extremity of the free end of an associated tine. In this regard, it will be noted that the interior tines are of rectangular cross-sectional configuration exclusive of the ribs 54 thereon and that the free end portions thereof define an angle of approximately 75° with respect to the longitudinal extent thereof. Moreover, the extremity of the free ends is beveled through the rectangular cross-section in a direction outwardly of the adjacent rib end at an angle of approximately 45° with respect to extent of the free end. This construction is preferred as it provides the necessary flexibility with sharp corners suitable for thatching. In its broadest aspects, however, it will be understood that other cross-sectional configurations and free end constructions can be utilized.

The provision of the band section 44 and the aforesaid position thereof within the tine part 18 is an important factor, in conjunction with the outwardly increasing flexibility of the intermediate portion 42 and rigidity of the handle engaging part 16, in providing the desired flexibility to the tines 46. The band section 44 permits the tines to flex upwardly and also serves to provide a desirable and necessary stability to the flexure of the tines one with respect to the other. To aid in this function, the band section 44 is preferably provided with a bead like strengthening rib 56 on the top surface thereof, as best shown in FIGS. 1 and 2.

It can thus be seen that there has been provided a rake head construction which is capable of being economically formed by molding the same as a unitary structure with a plastic material, such as polypropylene or the like. The arrangement permits a relatively large rake head to be formed while still retaining a comfortable relatively light overall weight. The structural arrangement of the component elements of the unitary structure permit the rake head to perform its intended functions with efficiency and without failure due to breakage or fatigue for an extended period of use.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. In a rake of the type including an elongated handle and a tine type rake head on one end of said handle, the improvement which comprises said rake head being molded of a plastic material as an integral unitary structure, said unitary structure comprising a handle engaging part and a tine part extending outwardly therefrom, said handle engaging part including a generally centrally located elongated longitudinally extending socket portion open at one end thereof for receiving therein the one end of said handle, a panel portion extending transversely from said socket portion, and rib portions formed on said panel portion cooperating with said socket portion and said panel portion to provide strength and rigidity to said handle engaging part both in the longitudinal direction of extent of said socket portion and in the transverse direction of extent of said panel portion, said tine part including an intermediate portion extending longitudinally outwardly from said handle engaging part with a transverse extent generally in the direction of said panel portion, said intermediate portion providing a continuous transversely extending band section at the outer extremity thereof spaced longitudinally from said handle engaging part within the outer half of said tine part, said intermediate portion having a plurality of openings formed therein between said band section and said handle engaging part cooperating with the thickness thereof to provide said intermediate portion with a flexibility which increases in a direction from said handle engaging part toward said band section, and a plurality of individual tines spaced transversely along said band section and extending outwardly thereof, each of said tines being of generally L-shaped configuration with their free ends extending in a direction generally transverse to the transverse extent of said band section.

2. The improvement as defined in claim 1 wherein said panel portion includes edges which diverge in an outward longitudinal direction from the open end of said socket portion, said rib portions including exterior ribs formed along the diverging edges of said panel portion and interior ribs extending transversely between the juncture of said panel portion edges with said tine part.

3. The improvement as defined in claim 2 wherein said intermediate portion includes edge sections disposed in general alignment with the edges of said panel portion, said plurality of openings in said intermediate portion between said edge sections being elongated so as to define a multiplicity of tine-shaped sections extending from said band section to said handle engaging part in generally aligned relation with said tines.

4. The improvement as defined in claim 3 wherein said tine part includes an outwardly tapering edge rib extending from an exterior rib of each panel portion edge along the associated edge section and tine to the free end of the latter.

5. The improvement as defined in claim 3 wherein each of said tine-shaped sections includes an outwardly tapering central rib extending therealong.

6. The improvement as defined in claim 5 wherein said central ribs project transversely from said tine-shaped sections in the direction of transverse extent of said tine free ends.

7. The improvement as defined in claim 6 wherein each of said tines includes a central rib extending therealong in generally aligned relation with the associated central rib of said tine-shaped sections.

8. The improvement as defined in claim 6 wherein said band section includes ribs on one surface thereof forming continuations of the associated central ribs of said tines and said tine-shaped sections, the opposite surface of said band section having a central rib extending therealong substantially throughout the transverse extent thereof.

9. The improvement as defined in claim 8 wherein the included angle between the legs of said L-shaped tines is approximately 75°.

10. The improvement as defined in claim 9 wherein the extremities of the free ends of said tines are beveled.

11. The improvement as defined in claim 1 wherein said plastic material is polypropylene.

12. The improvement as defined in claim 1 wherein said socket portion is closed at the end thereof opposite from said open end and has interior surface means conforming to the exterior surface means of the end portion of said handle received therein.

13. The improvement as defined in claim 12 wherein the interior surface means of said socket portion includes a generally dome-shaped surface at the closed end thereof and a frusto conical surface extending therefrom to said open end.

14. The improvement as defined in claim 13 wherein said socket portion includes an aperture extending transversely therethrough intermediate the ends thereof and an exterior boss surrounding said aperture, said rib portions including diagonal ribs extending from said boss in diverging relation with respect to each other to an exterior transversely extending rib.

* * * * *